Jan. 17, 1961 A. W. COOK 2,968,452
JET-STREAM AVIATING SYSTEM FOR AIRCRAFT
Filed Aug. 28, 1957 3 Sheets-Sheet 1
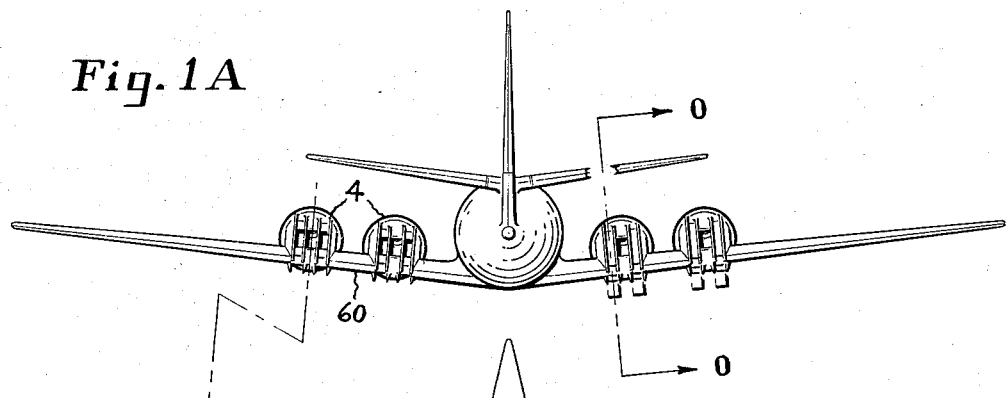
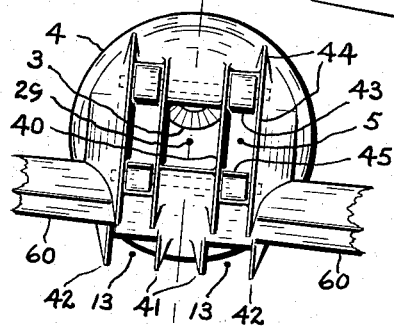
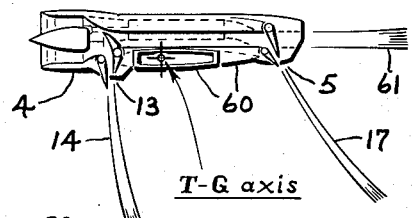
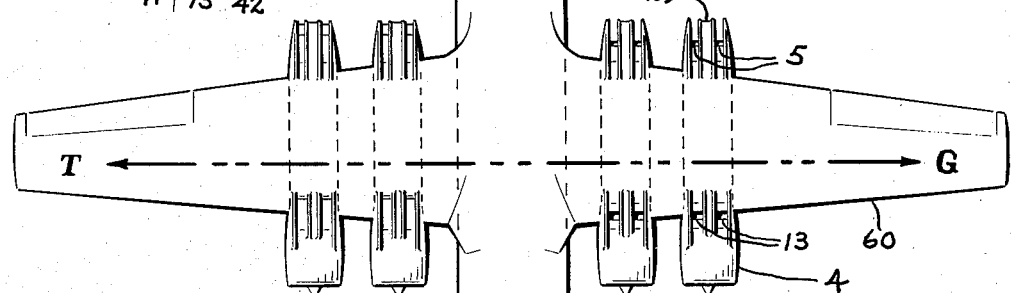
INVENTOR.
Alexander Wellington Cook

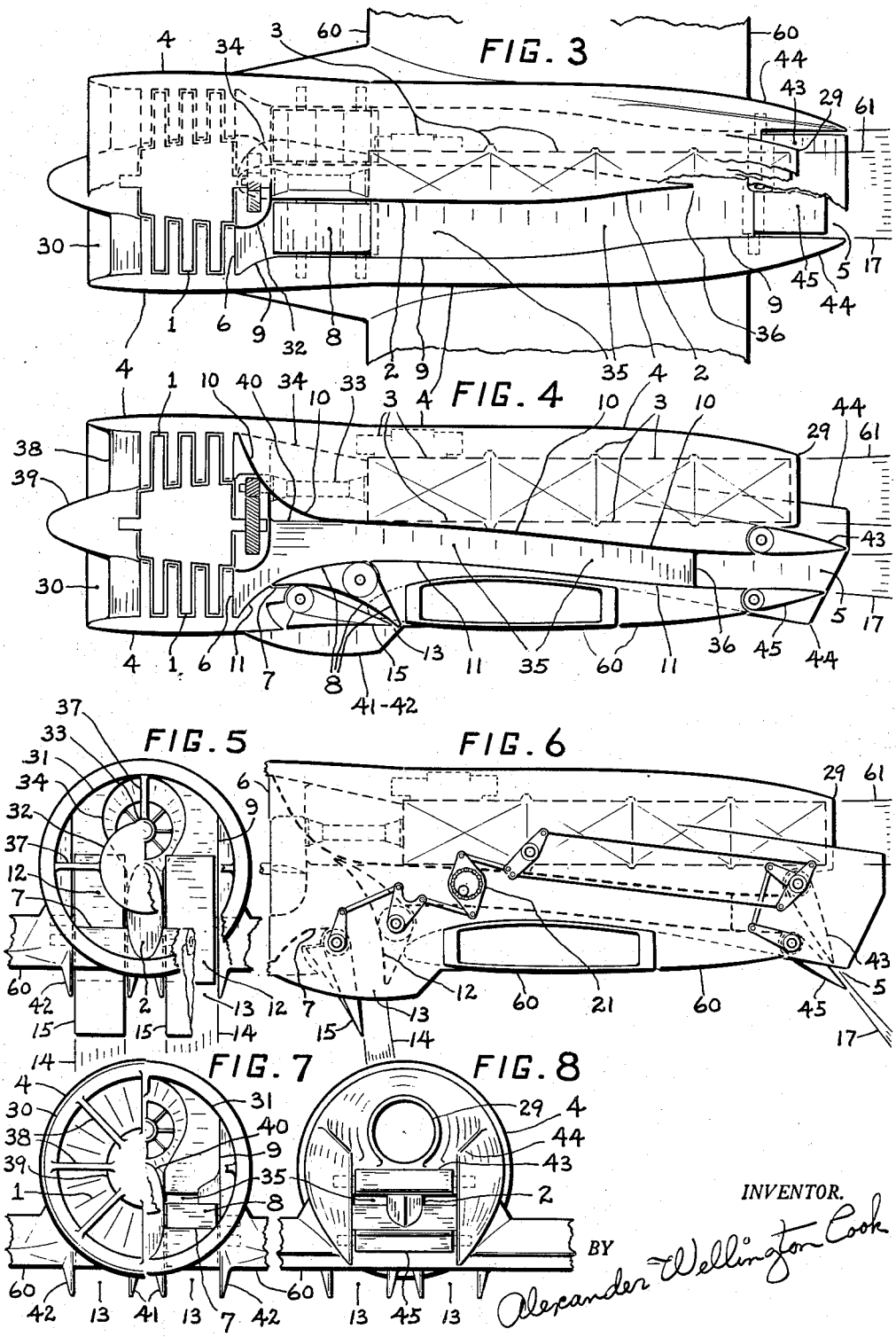

Jan. 17, 1961  A. W. COOK  2,968,452
JET-STREAM AVIATING SYSTEM FOR AIRCRAFT
Filed Aug. 28, 1957  3 Sheets-Sheet 3

INVENTOR.
BY Alexander Wellington Cook

2,968,452

JET-STREAM AVIATING SYSTEM FOR AIRCRAFT

Alexander Wellington Cook, Coventry, R.I.

Filed Aug. 28, 1957, Ser. No. 680,794

4 Claims. (Cl. 244—12)

The purpose of this invention is to add vertical flight, hovering, short take-off and landing capabilities to modern high speed aircraft by integrating a combination of co-ordinated aerodynamic devices into an airplane to provide lift, propulsion, stability and maneuverability continuously during all its phases of operation.

The basic function of this aviating system is for the production of several controlled and directed jet-stream columns of air or gas in such manner as to produce a sum total vector of lift and propulsive forces that counterbalance and overcome the force of gravity plus the aerodynamic resistance of the craft at all times to maintain its desired air-borne altitude, altitude direction and velocity, all completely controlled by suitable means directly from the pilot's seats.

The salient features of this invention are illustrated by the accompanying drawings, in which:

Figure 1A is the rear elevation view of an aircraft, showing two elongated streamline nacelle propulsion units mounted upon each wing;

Figure 2A is the bottom plan view looking upward, of the aircraft of Figure 1A, showing the two cuspal orifices and the two elevon orifices of each nacelle propulsion unit located on the right wing, all directed downward and indicating their relative positions to the transverse lateral gravitational axis line "T—G" of the aircraft;

Figure 3 is the plan view of a nacelle propulsion unit, the lower half of which is shown sectioned mainly along a horizontal longitudinal plane running through the interior of the left wind tunnel pipe;

Figure 4 is the side elevation of the nacelle propulsion unit of Figure 3, shown sectioned mainly along a vertical longitudinal plane running through the interior of the left wind tunnel pipe;

Figure 5 is a cross sectional view of a nacelle propulsion unit, looking aft directly into the diffusion chamber with portions of the reduction gear transmission case, streamline strut, cuspal flap and the cuspid valve seat shown cut away, and with the cuspid valves shown raised full up;

Figure 6 is another side elevation of the nacelle propulsion unit of Figure 3, having the orifices control and co-ordinating mechanism shown by solid lines as seen through the outer shell of the nacelle body, with the cuspal and elevon directionally movable variable nozzle orifices shown in their downwardly directed positions;

Figure 7 is the front end view of the nacelle propulsion unit of Figures 3 and 4, the right half of which is shown sectioned at the forward end of the diffusion chamber with most of the transmission case and streamline struts shown cut away;

Figure 8 is the rear end view of the nacelle propulsion unit of Figures 3 and 4, showing a single large elevon orifice located below the engine exhaust orifice;

Figure 10 is the cross sectional view at "O—O" of one of the nacelle propulsion units of Figure 1A, showing the specific relative location of the cuspal and elevon orifices to the transverse lateral gravitational "T—G" axis of the aircraft;

Figure 9:
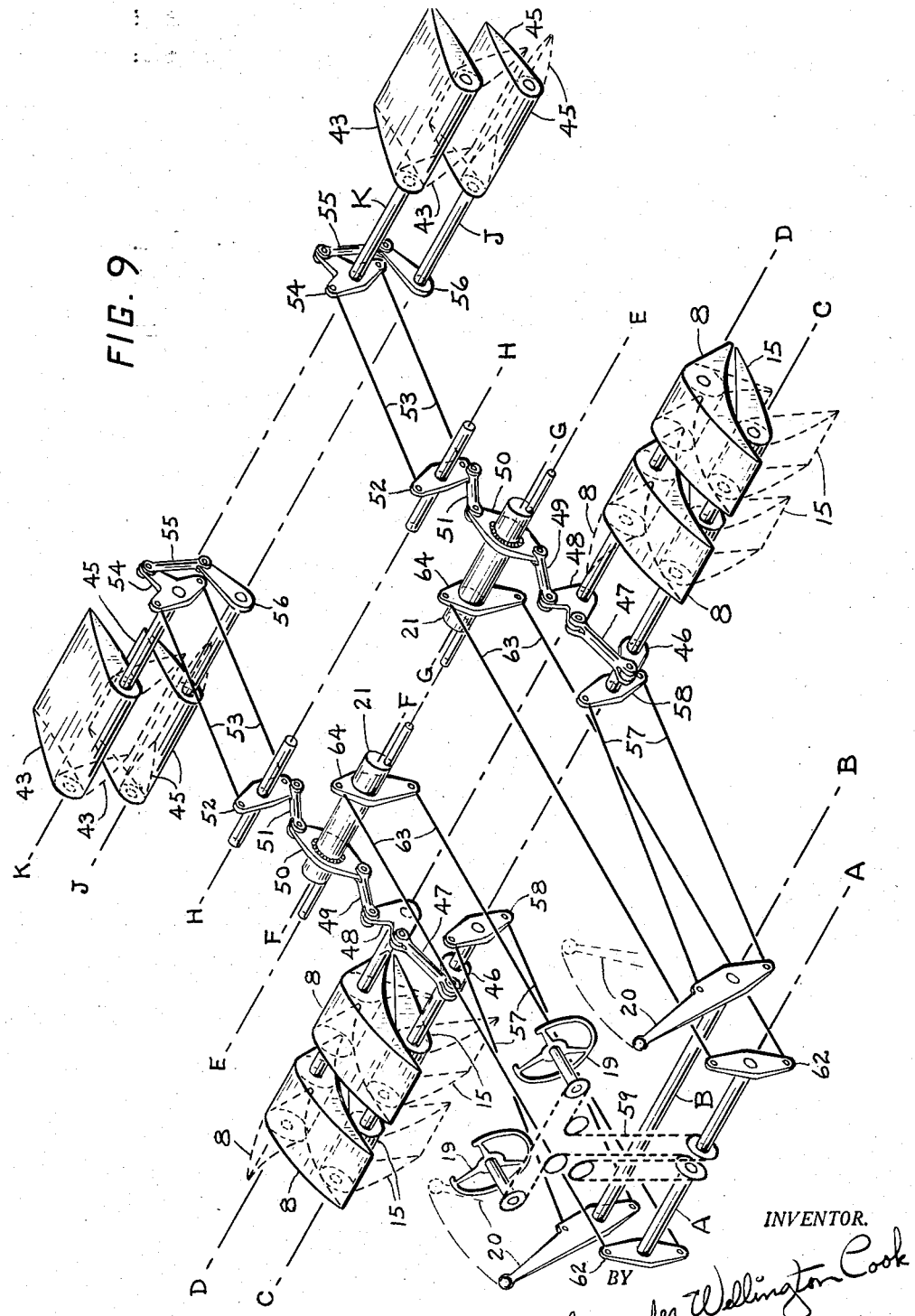
Figure 9 is an isometric perspective view of two of the nacelle propulsion units of Figures 3 and 4, showing a schematic layout of the linkages, motions and positions of the control and co-ordinating mechanisms of the cuspal and elevon orifices directly from the pilot's seats.

And Figure 11 is an enlarged rear end view of one of the nacelle propulsion units of Figures 1A and 2A, showing the elevon orifices located on each side of the engine exhaust orifice.

Incorporating this jet-stream aviating system into the design and structure of an airplane, consists primarily of mounting one or more elongated streamline nacelle propulsion units, each embodying an aerodynamically implemented diffusion-expansion wind tunnel powerplant, directly onto each wing, aligned longitudinally and so placed that the cuspal jet-streams 14 can flow downward just in front of the wings 60, and the elevon jet-streams 17 can flow diagonally downward just aft of said wings 60, as shown in Figures 2A, 6 and 10.

Each said nacelle body propulsion unit has five or six specific operational openings that function in conjunction with the enclosed diffusion-expansion wind tunnel to efficiently produce the co-ordinated high energy counterbalancing jet-stream columns of air or gas 14, 17 and 61. First, a large streamline annular shaped air intake opening 30 for the multistage compressor type ducted fan 1 comprises the whole front end of said nacelle body 4. Second and third, are two rectangular shaped variable nozzle tungus jet-stream orifices 13 for the diffusion chamber 31 placed side by side through the bottom wall structure of said nacelle body 4 just forward of the wing 60. The fourth, is a circular or rectangular shaped exhaust nozzle orifice 29 pointing directly aft for the turboshaft gas engine 3 placed just above the fifth or in between the fifth and sixth, which are rectangular shaped variable nozzle elevon jet-stream orifices 5 for the wind tunnel pipe exhaust channels 35, and both or all three terminate the entire aft end structure of said nacelle body 4 just aft of the wing 60, as shown in Figure 8 and Figure 11.

The structure of each said nacelle body unit is such that the entire forward end section of said nacelle body 4 is occupied by the multistage compressor type ducted fan 1, followed directly by the diffusion-chamber 31. And a streamline nose cone hub 39 with several slender streamline struts 38 equally spaced and radiating out to said nacelle body 4 supports the front end of said ducted fan 1. In the forward end of said diffusion chamber 31 is a drum-shaped reduction gear transmission case 32 attached to the aft end and centralized about the axis of said ducted fan 1. Said transmission case 32 is structually supported on its bottom half side by the forward end of a streamline central island pod 2 and on the top and sides by three slender streamline struts 37, each radiating out at ninety degree intervals to the said nacelle body 4. The said streamline central island pod 2 is a long box-shaped beam structure with flat vertical side walls 40 streamlined at both ends, and built along the inside central lower half of said nacelle body 4. Said central island pod 2 starts at the rear edge 6 of said ducted fan 1, fastens to the bottom half side of the transmission case 32 to form the lower central streamline saddle walls 40 of said diffusion chamber 31 and the inner side-walls of the cuspal variable nozzle orifices 13. From thence aft, said central island pod 2 conforms to the wing beam 60, forms the inner restraining side walls 40 of the two wind tunnel pipe exhaust channels 35 and; either ends with an apex edge 36, where said two exhaust channels 35 merge to enter a single large elevon jet-stream orifice 5 as shown in Figure 8; or continues straight back to form the side walls 40 of a rectangular shaped engine exhaust nozzle orifice 29, which are also the inner side walls 40 of smaller elevon orifices 5 located on each side of said exhaust orifice 29 as shown in Figure 11.

The aforesaid wind tunnel diffusion chamber 31 is a wedge shaped cavity attached directly to the aft end of said ducted fan 1 and straddles the streamline saddle portion 40 of the forward end of said streamline central island pod 2 and then divides to become the two said wind tunnel pipe exhaust channels 35 on each side of said central island pod 2. The intake end 6 of said diffusion chamber 31 is perfectly annular in shape where it fastens onto said ducted fan 1, however the cross sectional shape of said diffusion chamber 31 about its longitudinal axis changes quickly from the circular at said ducted fan 1 to specifically rectangular sections in its rearward structure, to the extent that the lateral elements of the top and bottom restraining walls 10 and 11 and the vertical elements of the side restraining walls 9 of said diffusion chamber 31 are all straight lines—furthermore the cross sectional area of said diffusion chamber 31 about its longitudinal axis rapidly becomes smaller in its rearward structure to the extent that the intake area at the ducted fan 1 is several times greater than the total cross sectional area of the two exhaust channels 35 or the two cuspal jet-stream orifices 13 thereby maintaining the air pressure rise necessary to produce the aforesaid high energy counterbalancing jet-stream columns of air 14 and 17. The aforesaid rapid reduction of cross sectional area of said diffusion chamber 31 is achieved by sloping the upper restraining wall 10 downward and to the rear at an angle of about sixty degrees from level and by sloping the lower restraining walls 11 upward and to the rear at an angle of forty five degrees, gradually curving and leveling them off into the respective upper and lower restraining walls 10 and 11 of the said two wind tunnel pipe exhaust channels 35, and by sloping the side restraining walls 9 inward and to the rear at an angle of thirty degrees from normal curving them quickly to become parallel at the cuspid valve seats 7 and throughout the remaining length of said diffusion chamber 31. Also the continuation of said restraining side walls 9 of said diffusion chamber 31 become the outer restraining side walls 9 of the said two exhaust channels 35 which, either curve slightly inward around the aforesaid streamline central island pod 2 to become a single channel at the apex edge 36 and merge into the aforesaid single large elevon jet-stream orifice 5 in the lower aft end of said nacelle body 4 as shown in Figure 8, or the said wind tunnel pipe exhaust channels 35 continue straight back into aforesaid smaller elevon orifices 5 located on each side of a rectangular shaped engine exhaust orifice 29 as shown in Figure 11.

From the upper edge of the aforesaid reduction gear transmission case 32 and running longitudinally aft just above the aforesaid central island pod 2, is a drive shaft housing 33 which connects said transmission case 32 with the aforesaid turboshaft gas engine 3 which is also located directly above and supported by the aft portion of said central island pod 2. And a cone shaped air intake duct 34 spaced around said drive shaft housing 33 connects the air intake of said turboshaft gas engine 3 with said diffusion chamber 31 through an aperture in the central portion of the sloping upper restraining wall 10 of said diffusion chamber 31 just above the streamline saddle 40.

The parallel vertical side walls of the aforesaid two rectangular shaped variable nozzle cuspal jet-stream orifices 13 located side by side in the bottom side of said nacelle body 4 just forward of the wing 60, are formed by extending downward the vertical side walls 40 of said central island pod 2 to make the inner cuspal fins 41, and by extending downward the vertical side walls 9 of said diffusion chamber 31 to make the outer cuspal fins 42. Between the parallel vertical walls of these two rectangular apertures are mounted the two cuspid valves 8 and the two cuspal flaps 15 on parallel lateral axes.

The said two rectangular shaped cuspal flaps 15 spaced and built around a shaft are hinged at the aft edges of the cuspid valve seats 7 located just under the front ends of said cuspid valves 8 when closed down. These said cuspid valves 8 are rectangular crescent shaped hollow rocker-beams spaced and built around a shaft passing through the middle of the crescent flat sides. Said cuspid valves 8 are mounted into said diffusion chamber 31, hinged into the lower walls 11 of the front end of said wind tunnel pipe exhaust channels 35 and so placed that the upper surfaces of said cuspid valves 8 when closed down become the lower restraining walls 11 of said diffusion chamber 31. When raised up said cuspid valves 8 gradually close off said exhaust channels 35, and the lower concave surfaces 12 of said cuspid valves 8 become the aft restraining walls of said diffusion chamber 31 and the aft walls of the variable nozzles of said cuspal jet-stream orifices 13. And the upper surfaces of said cuspal flaps 15 become the forward walls of the variable nozzles of said cuspal jet-stream orifices 13 when open.

The rear side walls of said nacelle body 4 are shaped into stubby tail fins 44, and the parallel vertical inner side walls of said tail fins 44 are the continuation of the outer side walls 9 of the aforesaid wind tunnel pipe exhaust channels 35 and form the parallel vertical outer side walls of the aforesaid rectangular shaped variable nozzle elevon jet-stream orifices 5. Between these parallel vertical walls of said tail fins 44 are mounted the rectangular shaped upper and lower jet-elevons 43 and 45 on parallel lateral axes in such manner that the bottom surface of said upper jet-elevons 43 becomes a continuation of the upper walls 10 of the said exhaust channels 35, and the top surface of said lower jet-elevons 45 becomes the continuation of the lower walls 11 of said exhaust channels 35. Said lower jet-elevon 45 is placed slightly forward of said upper jet-elevon 43 to maintain the proper shape and decreasing size of the orifice, as said jet-elevons are turned down.

In the spaces formed between the side restraining walls 9 of the diffusion-expansion wind tunnel and the outer shell structure of the nacelle body 4 is mounted the component parts of the co-ordinating and control mechanism for operating the aforesaid cuspid valves 8, the cuspal flaps 15 and the jet-elevons 43 and 45. Since all the aforesaid valves, flaps and elevons are mounted on shafts that turn on fixed parallel lateral axes, all of the component parts of this mechanism within the nacelle body 4 operate on parallel lateral axes, and said component parts may be duplicated on both sides of said wind tunnel. The cuspal flaps 15 are mounted on a shaft that turns on lateral axis C, and a lever arm 46 on said shaft C connects through link 47 with a twin lever arm 48 on shaft D which carries the cuspid valves 8, said twin lever arm 48 connects through link 49 with one end of the rocker beam 50 of an eccentric differential unit 21 made by mounting the center roller bearing of said rocker beam 50 on a short eccentric shaft F or G that turns on the fixed lateral axis E, the other end of said rocker beam 50 connects through link 51 with a twin arm rocker beam 52 mounted on a fixed lateral axis H, said twin arm rocker beam 52 is connected by two cables 53 with a triple lever arm 54 mounted on shaft K which carries the upper jet-elevon 43, and said triple lever arm 54 is connected through link 55 with a single lever arm 56 on the shaft J which carries the lower jet-elevon 45.

The aforesaid controlling and co-ordinating mechanism is so specifically designed, shaped and arranged that when the cuspid valves 8 are closed down the cuspal flaps 15 are closed up close to the concave side 12 of said cuspid valves 8, thereby fully closing the cuspal orifices 13 while the elevon orifices 5 are full open and aimed directly aft for the high speed linear flight condition. When the cuspid valves 8 are opened up, the cuspal orifices 13 open, become larger and turn downward while the elevon orifices 5 turn downward and become smaller. And when the cuspid valves 8 are full open, the cuspal orifices are full open and aimed directly down, while the elevon orifices 5 are turned diagonally downward and almost closed for the low speed vertical flight operating conditions.

To produce these high energy counterbalancing jet-stream columns of air or gas 14, 17 and 61, each areodynamically implemented diffusion-expansion wind tunnel powerplant functions as follows. The turboshaft engine 3 drives the multistage compressor type ducted fan 1 through drive shaft 33 and reduction gear transmission 32. Said ducted fan 1 sucks air in through the large air intake opening 30 in the front end of the nacelle body 4 and compresses said air directly into the diffusion chamber 31, from which said compressed air flows into the two wind tunnel pipe exhaust channels 35 on each side of the streamline central island pod 2, and is expanded directly aft out through the elevon orifices 5 to produce the elevon high energy counterbalancing jet-stream columns of air 17, for the high speed linear flight condition when the cuspid valves 8 are closed down. Also compressed air flows directly into said turboshaft engine 3 from said diffusion chamber 31 through the cone shaped air intake duct 34 spaced around said drive shaft housing 33, and said turboshaft engine 3 exhausts directly aft through exhaust nozzle orifice 29 to produce the fixed high energy counterbalancing jet-stream column of gas 61. When the cuspid valves 8 are opened up a little they split the airflow, forcing part of it downward and backward at about forty five degrees along the lower concave surface 12 of said cuspid valves 8, while the remaining airflow is over the top of said cuspid valves 8 into the aforesaid wind tunnel pipe exhaust channels 35. As the said cuspid valves 8 are opened up wider, a greater percentage of the airflow is through the cuspal orifices 13, and when fully open said cuspid valves 8 completely block off said exhaust channels 35 forcing the airflow directly downward out through said cuspal orifices 13 to produce the cuspal high energy counterbalancing jet-stream columns of air 14 for the vertical flight operating conditions. When the cuspal jet-streams 14 are turning downward and becoming stronger, the elevon jet-streams 17 are also turning downward and becoming weaker, to maintain balance and accomplish the transition from high speed linear flight to vertical flight operating conditions and vice versa.

The control and co-ordination of all said nacelle units of the airplane directly from the pilot's seats is accomplished first, by mounting a single or dual vector control lever unit 20 on a lateral torque shaft and axis B near the pilot's seat. Said vector control lever unit 20 is directly connected by two cables 57 with each double lever arm 58 attached to the end of the cuspal flap shaft C of each said nacelle unit, so that all said nacelles units function simultaneously to accomplish the smooth transition from the low speed vertical flight operating condition to the high speed linear flight condition or vice versa. And second, by adding elevon differential torque shafts A having a double lever arm 62 mounted on the outer end of each said shaft and hinged on a common lateral axis A, to the conventional dual wheel or stick control unit 19 in front of the pilot's seats. Each said double lever arm 62 on the respective right and left hand sides of said control unit 19 are each directly connected by two cables 63 with a double lever arm 64 attached to the end of the eccentric shaft F or G of the cuspal-elevon eccentric differential unit 21 located in each said nacelle unit that is mounted upon the respective right and left wings of the airplane, in such manner that when said dual wheel or stick control column 19 is moved backward and forward, all elevon orifices 5 on both the right and left sides of the airplane, move up and down simultaneously to accomplish longitudinal balance, control and stability for the low speed vertical flight operating conditions. And when said control wheel or stick 19 is turned or moved to the right, the elevon orifices 5 on the right side of the airplane move up while the orifices 5 on the left side move down, and vice versa to accomplish lateral balance, control and stability for the low speed vertical flight operating conditions.

And finally a bank of power throttle levers are hinged side by side on a single lateral axis and mounted between the pilot's seats to provide simultaneous or independent power control for each nacelle unit, and thereby also accomplish directional control and stability for the low speed vertical flight operating conditions. Since the distance between the pilot's seats and the nacelle units located on the wings may be considerable and their respective positions not in a direct line with each other, this invention covers the use of additional linkages and other methods of transmitting mechanical force and motion, such as electrical, hydraulic and pneumatic mechanisms, to accomplish the specific control and coordination movements between said pilot's seats and all of said nacelle units as nominally stated in the preceding specification and the following claims.

From the foregoing description of the component parts and mechanical structure of this jet-stream aviating system, it is clear that when the vector control lever 20 is in the extreme forward position, the sum total thrust is directly aft and the system functions as in the normal jet propelled airplane. However as said vector control lever 20 is moved rearward, cuspal jet-streams 14 of increasing strength are directed downward in front of the wings and elevon jet-streams 17 of decreasing strength are directed downward aft of the wings in such co-ordinated proportion in conjunction with the fixed exhaust jet-streams 61, as to produce a sum total vector of the counterbalancing jet-stream thrust forces on the airplane, that will provide a direct and completely balanced lift for low speed and vertical flight capabilities. And also the specific differential control mechanism of the elevon orifices 5, that is incorporated and co-ordinated into the conventional dual wheel or stick control system plus the bank of power throttle levers, provides complete directional, lateral and longitudinal balance, stability and maneuverability for these low speed vertical flight operating conditions, as well as the high speed linear flight condition. The transition from full vertical flight to high cruising speed and conversely, may be accomplished by moving the vector control lever 20 smoothly from one extreme position to the other, or it may be stopped at any intermediate setting of the flight operating conditions. In other words, the aircraft may be flown continuously at any linear speed from zero to its maximum under complete control.

Therefore then, this invention is explicitly and specifically or one or more unitarily embodied powerplants attached to each wing of an airplane for generating several specific high energy counterbalancing jet-stream columns of air or gas, controlled, co-ordinated and directed diagonally downward and directly downward in front of the wings and substantially forward of the transverse lateral gravitational axis of the craft, and directly aft and diagonally downward just aft of the wings and substantially aft of the transverse lateral gravitational axis of the craft to accomplish lift, propulsion, stability and maneuverability; said embodied powerplant units each having five or six specific operational openings or orifices specifically arranged, shaped and implemented exactly as shown by the drawings to control and co-ordinate these high energy counterbalancing jet-stream columns of air or gas directly from the pilot's seats.

I claim:

1. A jet-stream aviating system for aircraft comprising two or more elongated streamline nacelle propulsion units spaced parallel along longitudinal axes and mounted upon the wings near the sides of the aircraft body; each said nacelle propulsion unit consists primarily of an axial flow multistage compressor type ducted fan having a large annular intake opening in front and occupying the entire front end of its nacelle and driven through reduction gears by a turboshaft gas engine, the rear face outlet of said ducted fan couples directly onto the annular shaped front face inlet of a diffusion chamber which is a wedge shaped cavity that changes rapidly into rectangular cross sectioned outlets so proportioned in size that the area of the annular inlet is several times greater than the area of the outlets, said diffusion chamber has five specific outlets, three rearward and two directly downward, the upper rear outlet of said chamber couples onto the intake of said turboshaft engine, and the other two rear outlets couple onto separate rectangular section wind tunnel pipes lying above the wing longitudinally along each side of said engine and terminating into directionally movable rectangular shaped variable nozzle jet-stream elevon orifices located each side of or just below said engine tailpipe, and all said elevon orifices are so specifically located longitudinally aft of the trailing edge of said wings as to react along vector thrust lines substantially aft of the transverse lateral gravitational axis of the aircraft, when said elevon orifices are turned downward, and the two downward outlets of said diffusion chamber connect separately onto directionally movable rectangular shaped variable nozzle jet-stream cuspal orifices through rectangular crescent shaped cuspid valves in the bottom side of said diffusion chamber, and all said cuspal orifices are so specifically located longitudinally forward of the wings as to react along vector thrust lines substantially forward of the transverse lateral gravitational axis of the aircraft; each said variable nozzle elevon orifice consists of two rectilinear shaped flaps spaced apart to form the throat of said orifice and hinged into the upper and lower walls respectively of its wind tunnel pipe on parallel axis shafts so linked together by lever arms and a push rod, that said flaps can be moved in parallel unison up or down between the extended side walls of said wind tunnel pipe to form the aforesaid elevon orifice; each said variable nozzle cuspal orifice consists of a rectilinear shaped flap in front of a rectangular crescent shaped cuspid valve spaced apart to form the throat of said orifice and hinged into the bottom wall of said diffusion chamber on parallel lateral axis shafts so linked together by lever arms and a push rod, that said flap and said valve can be moved in parallel unison between parallel vertical longitudinal fins extending down from the bottom side of said diffusion chamber to form the aforesaid cuspal orifice; each said crescent shaped cuspid valve being mounted on a shaft through the middle of its crescent faces, serves also as a progressively selective two-way valve hinged into the bottom rear corner edge of said diffusion chamber, to proportionately and inversely divide the size of the openings to its wind tunnel pipe and its cuspal orifice as said cuspid valve is positioned up or down; and all said directonally movable variable nozzle cuspal and elevon orifices in each aforesaid nacelle propulsion unit are so linked together by suitable cables, pulleys, push rods, lever arms, rocker beams and eccentric differential co-ordinating mechanisms and in such manner that when the aforesaid cuspid valves are opened upward, said cuspal orifices are opened, turned downward and become larger while said elevon orifices are turned downward and become smaller and vice versa.

2. A jet-stream aviating system for aircraft, as defined in claim 1, in which the said variable nozzle orifice operating mechanism within each of the aforesaid nacelle propulsion units are all linked together and controlled simultaneously by a special vector control lever located at the pilot's seats through a suitable means of lever arms, cables, pulleys and electric, hydraulic or pneumatic servo mechanisms.

3. A jet-stream aviating system for aircraft, as defined in claim 1 in which the said eccentric differential co-ordinating unit of the said variable nozzle operating mechanism within each of the aforesaid nacelle propulsion units mounted upon the right wing of the aircraft are all linked together and controlled simultaneously by the right-hand side of the conventional dual wheel aero control unit located in front of the pilot's seats, and similarly the said eccentric differential co-ordinating units located in the nacelles on the left wing of the aircraft are all linked together to the left-hand side of said dual wheel aero control unit through a suitable means of cables, pulleys, lever arms and servo mechanisms, in such manner that all said directionally movable variable nozzle elevon orifices function as elevons for the aircraft.

4. A jet-stream aviating system for aircraft, as defined in claim 1, in which each said turbo shaft gas engine within the aforesaid nacelle propulsion units is linked separately to a bank of power control levers located between the pilot's seats through a suitable means of cables, pulleys and lever arms in such manner that the power output of each said engine can be controlled independently of, or simultaneously with, all the other said turboshaft engines of the aircraft.

References Cited in the file of this patent

UNITED STATES PATENTS

| | | |
|---|---|---|
| 2,601,458 | Robert | June 24, 1952 |
| 2,696,956 | Farr | Dec. 14, 1954 |
| 2,738,147 | Leech | Mar. 13, 1956 |
| 2,752,109 | Lippisch | June 26, 1956 |
| 2,774,554 | Ashwood | Dec. 18, 1956 |

FOREIGN PATENTS

| | | |
|---|---|---|
| 130,641 | Sweden | Jan. 23, 1951 |
| 530,577 | Canada | Sept. 18, 1956 |